United States Patent Office 2,770,820
Patented Nov. 20, 1956

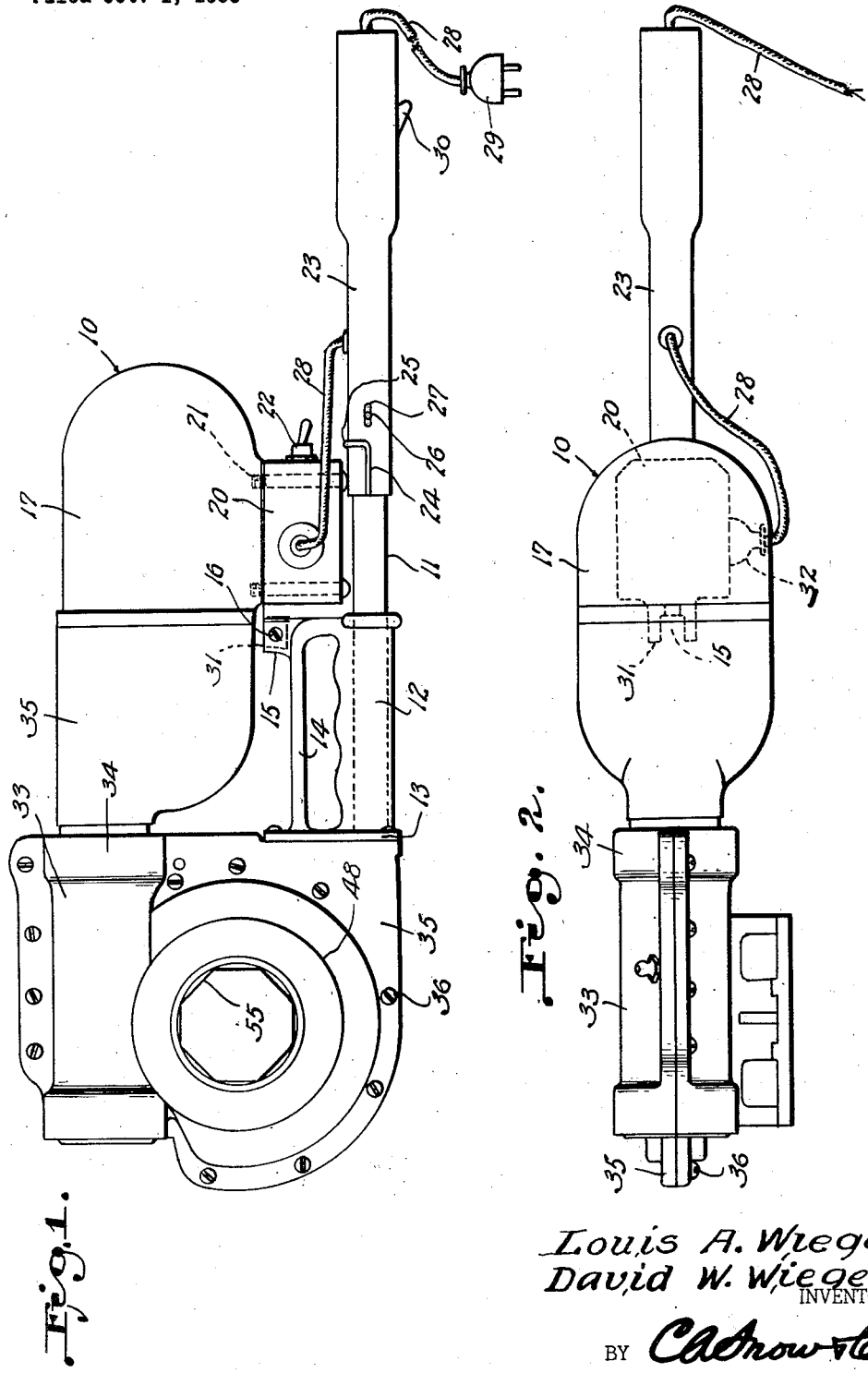

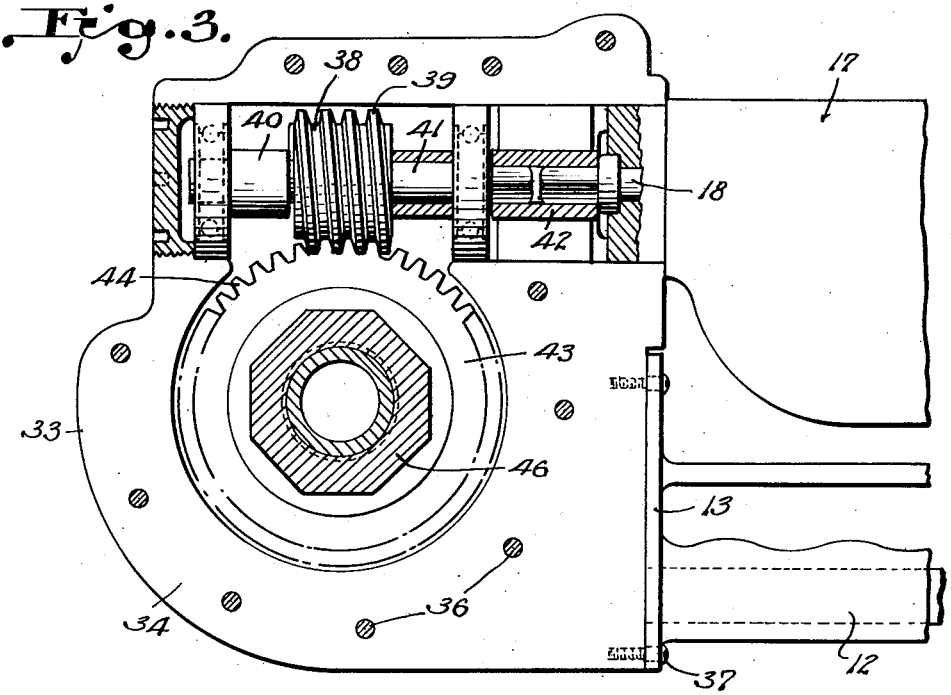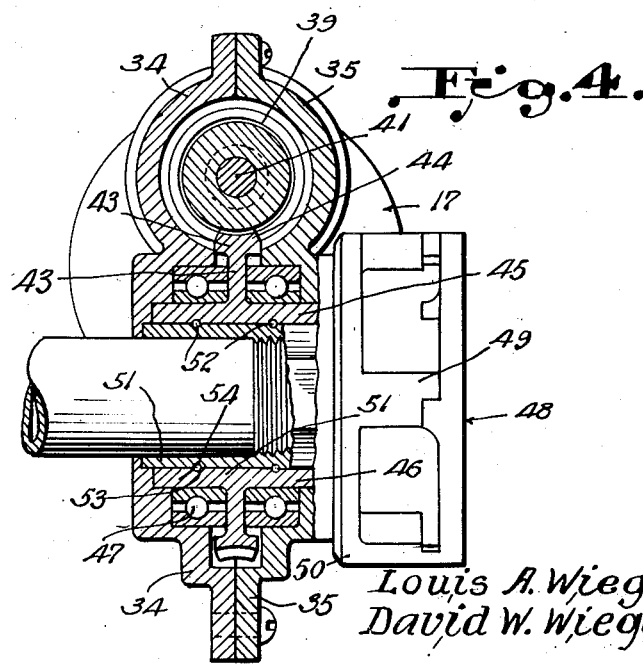
Louis A. Wiegel
David W. Wiegel INVENTORS.

2,770,820

PORTABLE PIPE THREADING TOOL

Louis Adolph Wiegel and Dave Wilson Wiegel, El Dorado, Ark., said Louis Adolph Wiegel assignor to Carol Mary Wiegel, El Dorado, Ark.

Application October 1, 1953, Serial No. 383,482

1 Claim. (Cl. 10—89)

This invention relates to an improved portable electric pipe threading tool and more particularly to a portable pipe cutting tool with an electric motor for actuating a pipe cutting tool for cutting or threading a pipe, even in the most inaccessible locations, by a workman supporting the tool in his arms for moving the tool to a selected location on the pipe.

It is another object of this invention to provide an improved portable electric pipe threading tool of the kind to be more particularly described hereinafter having fewer working parts than used in present tools of this kind enabling the gear housing to be streamlined permitting the threading of a pipe in presently inaccessible locations and having fewer bearings in the machine.

It is still another object of this invention to provide an improved portable electric pipe threading tool of this kind having a floating drive shaft between the electric motor and the drive gear of the tool to permit a proper alignment of the drive shaft and drive gear thereby preventing an overheating of the tool.

A further object of this invention is to provide an electric pipe threading tool of this kind having an electric motor and switch assembly so connected together as a unit on a supporting handle and detachably engaged with the gear mechanism whereby the motor unit may be readily detached from the supporting handle and the gear mechanism for repairs or changes of the motor.

A still further object of this invention is to provide an improved portable electric threading tool of this kind having a die support to readily accommodate various sized dies which may be readily used in the tool and just as readily removed when and as desired.

Yet another object of this invention is to provide an improved portable electric pipe threader of this kind having an added safety switch built into the handle to add to the compactness and portability of the tool.

Other and further objects and advantages of the invention will be hereinafter described and the novel features thereof defined in the appended claim.

In the drawings:

Fig. 1 is a side elevation of an improved electric portable pipe threading tool constructed according to an embodiment of our invention.

Fig. 2 is a top plan view.

Fig. 3 is a vertical longitudinal section, partly broken away.

Fig. 4 is a vertical transverse section.

Referring to the drawings the numeral 10 designates generally an improved portable electric pipe threading tool constructed according to an embodiment of our invention and the tool 10 is secured at one end of a supporting rod 11 which may be carried about by a person working on a length of pipe for either cutting the length of the pipe to a suitable length or for threading the pipe with desired threads.

The supporting rod 11 is provided with a handle body 12 adjacent one end thereof and a disk 13 is formed on one end of the handle body 12 extending transversely outwardly therefrom perpendicular to the axis of the handle body 12 for the purposes to be described more specifically hereinafter.

A handle 14 is formed integral with the disk 13 and handle body 12 at one end of the handle body for the attachment of the pipe cutting means employed with this tool. The handle 14 is spaced outwardly from the handle body 12 to provide room for the hand of a person handling the tool. An outwardly extending lug 15 is formed on the handle body 12 at the other end thereof remote from the disk 13 for the attachment of the motor and motor switch to be more specifically described hereinafter.

A motor housing 17 is formed for engagement about a suitable reversible electric motor having a motor shaft 18 therein and extending outwardly from the motor housing. The motor shaft 18 has a polygonal end outwardly of the motor housing 17 for slidable engagement with the gear means in the gear housing to be more particularly described hereinafter.

A separate switch box 20 is secured to the motor housing 17 by elongated bolts 21 so that the electric switch box 20 and the motor housing may be removed and inserted into the tool as a unit. A switch 22 is carried by the switch box 20 and has a handle extending outwardly therefrom for engagement by the fingers of a hand of an operator of the tool.

A handle for the tool is provided by an elongated tubular member 23 having a bayonet slot 24 at one end thereof for engagement with a locking pin 25 on the end of the supporting rod 11 remote from the disk 13. A cotter pin or bolt 26 is extended through the handle 23 and the supporting rod 11 for securing the handle in place on the rod and an elongated slot 27 is formed in the handle through which the cotter pin or bolt may be extended.

An electric wire 28 is extended through the handle 23 and is provided with an electric plug 29 at one end thereof, remote from the handle, for insertion into a suitable source of electric supply and the wire is also connected to a safety switch 30, carried by the handle 23 which switch may be readily reached by the fingers of a person handling the tool 10 with one hand while the other hand is placed in grasping relation on the handle 14.

Lugs 31 are formed on the switch box 20 for bearing engagement on opposite sides of the lug 15 which is secured to the handle body 12, or formed integral therewith and the lugs are secured together by a single bolt 16 which extends through aligned openings in the lugs 15 and 31 so that the motor and switch box unit may be secured or removed by the single bolt 16 in place of the plurality of bolts heretofore used for a similar purpose.

The end of the electric wire 28 adjacent to the switch box is provided with an electric plug 32 for slidable engagement into the switch box or removable therefrom when the switch box and motor unit are to be removed from the tool.

A gear housing 33 is supported on one end of the supporting rod 11 immediately adjacent to the handle 14 and the gear housing may be formed in two parts 34 and 35 for engagement on opposite sides of the gears of the tool which sides of the gear housing are secured together by securing bolts 36 and both sections of the gear housing 33 are secured on the handle 14 by suitable screws 37 which are engaged through the disk 13 and into the adjacent walls of the gear housing.

The gear housing 33 is somewhat cylindrical at its upper end within which a worm 38 is rotatably supported for rotation therein, the worm 38 being provided with outwardly extending helical threads 39 extending along the length thereof.

The worm 38 having the threads 39 thereon is formed with a sleeve 40 integral with the opposite ends thereof which sleeve is irregular in its circumference for slidably receiving a stub shaft 41 which is rotatably journalled in the gear housing 33 parallel to the supporting rod 11 and handle body 12 by being spaced outwardly therefrom. A collar 42 is engaged about the polygonal end of the motor shaft 18 and the irregular stub shaft 41 for rotating the worm 38 upon actuation of the motor within the motor housing 17.

The lower end of the gear housing 33 is circular in formation having the axis thereof at right angles to the axis of the handle body 12 and the flat sides of the gear housing parallel to the axis of the supporting rod and handle body.

A worm gear 43 is rotatably contained within the gear housing 33 and between the sides 34 and 35 thereof having the circumferentially and outwardly disposed teeth 44 in meshing engagement with the worm 38 where upon movement of the motor shaft the worm gear will be caused to rotate. The worm gear 43 is provided with outwardly extending flanges 45 extending outwardly from a sleeve, cylindrical hub 46 and the hub 46 is journalled within the gear housing 33 for free movement therein by the ball bearings 47.

The inner surface of the tubular hub 46 is polygonal in configuration for supporting a die stock 48 therein and rotating the die stock 48 upon rotation of the worm gear 43.

A die support 49 is carried by the die stock 48 within which an adaptor of various types of dies or pipe cutting tools may be slidably supported, the die supports having spaced apart discs 50 formed integral with a sleeve 51 which is slidably engaged within the polygonal openings in the hub of the worm gear 43.

Annular grooves 52 are formed on the outer surface of the sleeve 51 and similar grooves 53 are formed on the confronting surfaces of the hub 46 for receiving therein a resilient retaining ring 54 for adequately supporting the die stock 48 in the worm gear 43 for rotation therewith.

In the use and operation of the tool 10, constructed according to an embodiment of this invention, a suitable die stock 48 is inserted into engagement with the worm gear and a properly selected die may be inserted into the die stock 48 for threaded or cutting engagement with a pipe to be cut by the tool. The hub of the worm gear 43 is provided with flanges on opposite sides thereof, adjacent to the axis of the worm gear and the die stock is secured to or formed integral with one end of an elongated cylindrical sleeve and is positioned exteriorly of the gear housing 33 and tool 10. Flanges on the other side of the worm gear are open at the end thereof on the opposite side of the gear housing and provide a pipe support for the pipe which is to be cut or threaded. Upon engagement of a pipe to be cut or threaded into the pipe guide flanges, opposite to the die stock of the tool the pipe may be moved parallel to the supporting rod and handle body so that upon closing of the switches 22 and 30 the pipe cutting die, or other pipe threading tool, may be moved rotatably in engagement with the outer surface of the pipe to be cut.

While the specific details of one embodiment of this invention have been herein shown and described, the invention is not confined thereto as changes and alterations may be made without departing from the spirit and scope thereof as defined in the appended claim.

We claim:

A portable pipe threading tool comprising a gear housing, a worm rotatable in said housing, a worm gear rotatable in said housing meshing with said worm, a die stock secured to said worm gear, a motor housing extending from said gear housing, a forward portion of said motor housing being supported in a recess in the gear housing, said recess being concentric with the worm gear and said motor housing supporting a reversible electric motor having a driving element for clutching engagement with the worm gear, a switch member controlling the motor, means securing said switch member to said motor housing, a pair of lugs carried by said switch member, a looped handle between said gear housing and said switch, a disc at the forward end of said handle, means securing said disc to said gear housing, a lug carried by said handle engaging between said pair of lugs, a bolt extending through said pair of lugs and said latter named lug, an elongated handle extension, and means detachably securing said handle extension to said handle.

References Cited in the file of this patent

UNITED STATES PATENTS

| | | |
|---|---|---|
| 368,426 | Ruttmann | Aug. 16, 1887 |
| 502,686 | Tilton | Aug. 1, 1893 |
| 1,384,811 | Strand | July 19, 1921 |
| 1,871,732 | Olmstead | Aug. 16, 1932 |
| 2,160,274 | Lopez | May 30, 1939 |
| 2,567,784 | Ridgeway | Sept. 11, 1951 |

FOREIGN PATENTS

| | | |
|---|---|---|
| 361,117 | Great Britain | Nov. 19, 1931 |